Sept. 10, 1968     D. A. STANWOOD     3,401,116
METHOD OF CHLORINATING WATER IN A RESERVOIR AND
APPARATUS THEREFOR
Filed Sept. 29, 1966     3 Sheets-Sheet 1

INVENTOR.
DAVID A. STANWOOD
BY
ATTORNEYS.

Sept. 10, 1968     D. A. STANWOOD     3,401,116
METHOD OF CHLORINATING WATER IN A RESERVOIR AND
APPARATUS THEREFOR
Filed Sept. 29, 1966                                       3 Sheets-Sheet 2
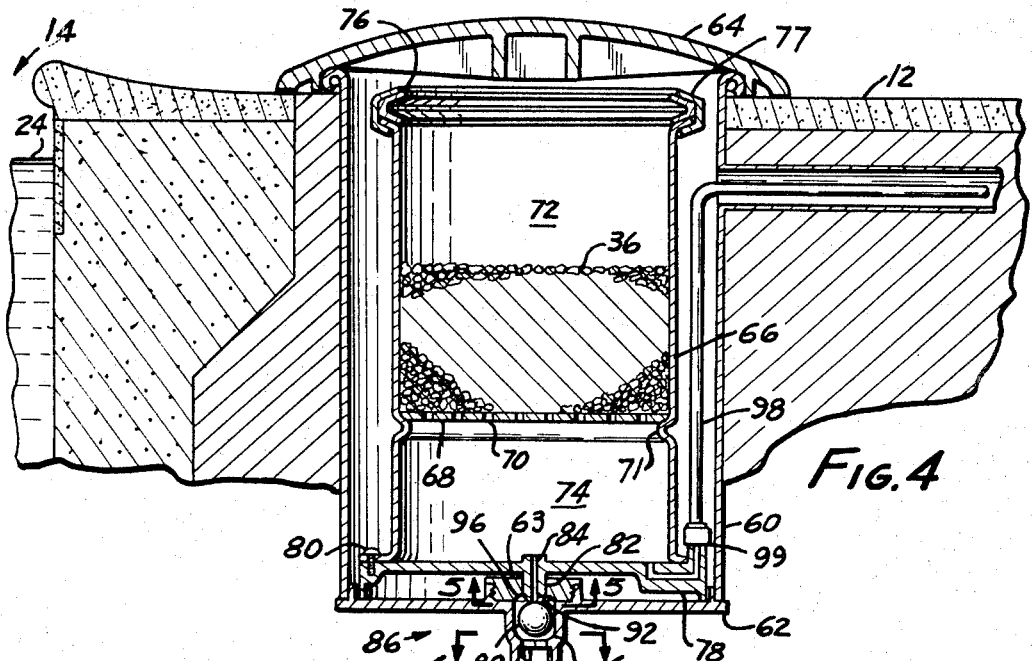
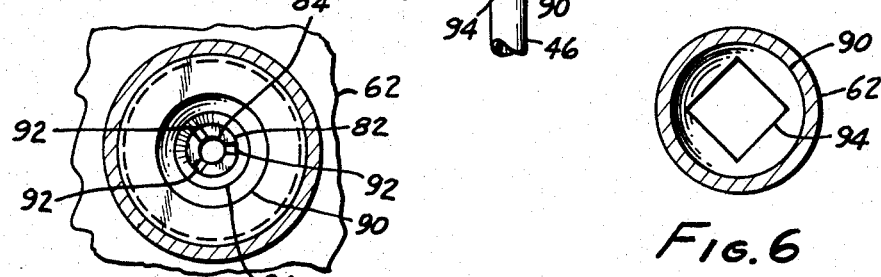
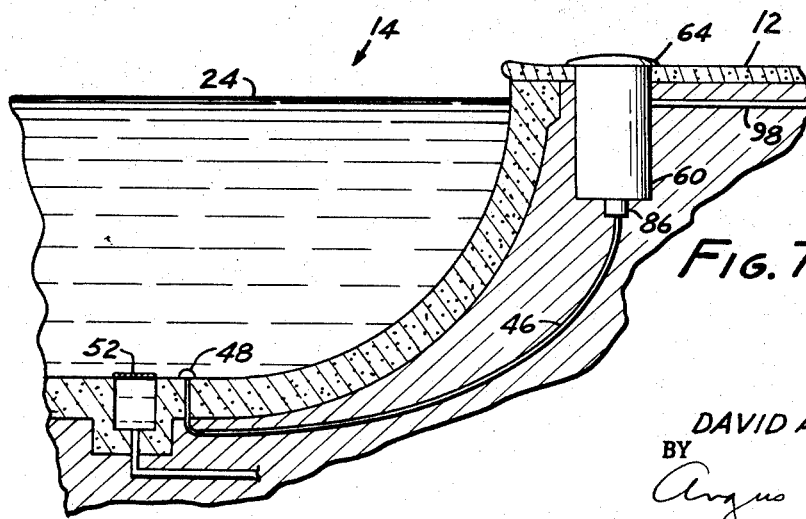
INVENTOR.
DAVID A. STANWOOD
BY
ATTORNEYS.

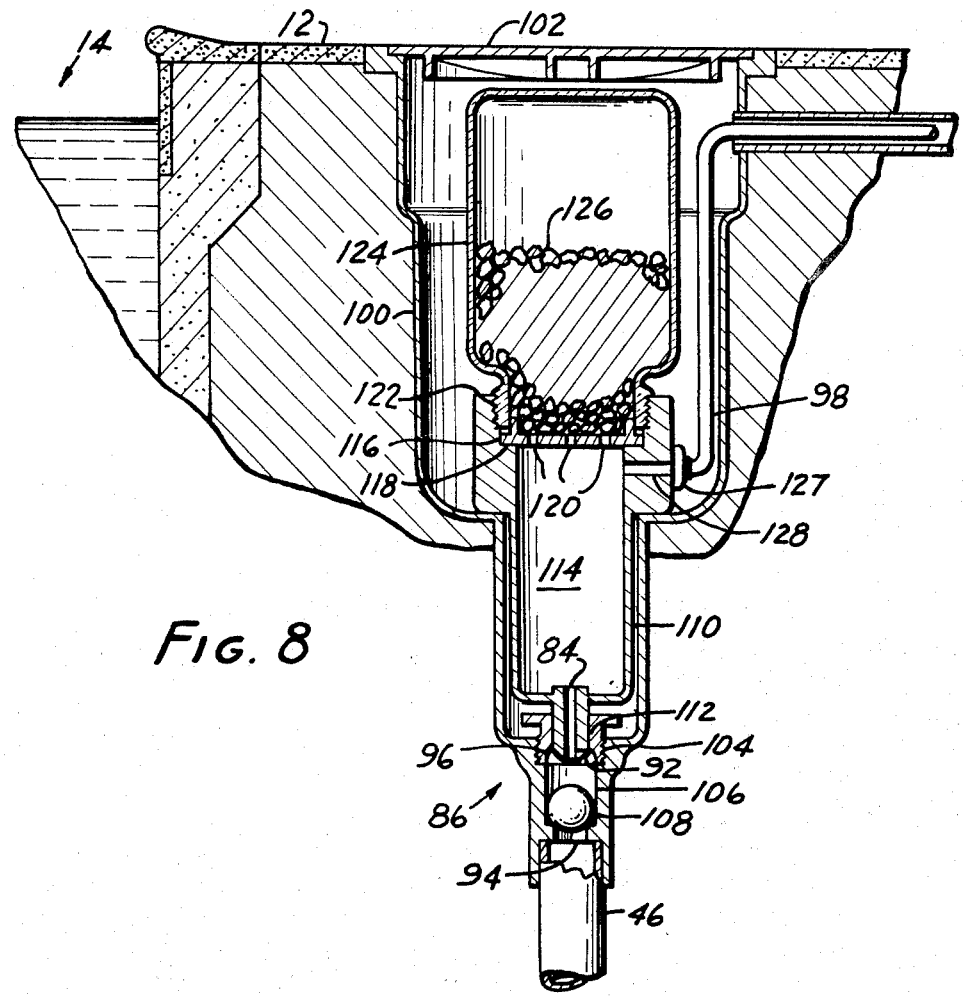

United States Patent Office 3,401,116
Patented Sept. 10, 1968

3,401,116
METHOD OF CHLORINATING WATER IN A RESERVOIR AND APPARATUS THEREFOR
David A. Stanwood, El Monte, Calif., assignor to Swimquip, Inc., El Monte, Calif., a corporation of California
Filed Sept. 29, 1966, Ser. No. 583,028
20 Claims. (Cl. 210—62)

This invention relates to water treatment and, more particularly, to the chlorination of water, especially in reservoirs such as swimming pools.

An object of the invention is to introduce water treatment chemical, ordinarily chlorine, into a water reservoir or swimming pool. A related object is to regulate the rate at which the chemical is introduced. A further related object is to facilitate the introduction of such chemical into the reservoir water.

Treatment of swimming pool water and the like ordinarily involves introduction of measured amounts of chlorine into the water periodically. Although the chlorine can be introduced in substantial quantity at relatively infrequent intervals, such as once every two or three days, it is more desirable to introduce it more continuously and regularly and in smaller quantities for the purpose of maintaining a fairly uniform concentration of the chlorine.

The invention is carried out by a novel method and system in which a cycling process expels the chemically treated or chlorinated water into the reservoir or swimming pool. In accordance with the invention there is provided an enclosed tank having means therein for supporting a substance containing the chemical, ordinarily a chlorine compound, at a position above the bottom of the tank. A conduit is arranged to connect the part of the tank beneath the chemical substance with the reservoir such that when the chemical substance is contacted by the water, gas of the chemical, ordinarily chlorine, is released into the tank and a portion of the gas dissolves in the water in the tank. The gas which remains undissolved adds its pressure on the tank water to lower the water level in the tank below the chemical substance, thus preventing further reaction between the water and the substance.

A feature of this invention resides in the introduction of water from a suitable water source into the tank beneath the chemical substance at a regulated rate.

Assuming now that the gas pressure has just produced a lowering of the water level in the tank attended by a corresponding expulsion of some water out from the tank through the conduit, the water being added from the water source can absorb more of the gas of the chemical, ordinarily chlorine. The added water continues to absorb gas of the chemical until the pressure of the gas is reduced sufficiently to allow the water to rise again until it contacts and wets the chemical on the supporting means to repeat the cycle.

The rate of repetition of the gas generation cycle can be adjusted by regulation of the rate of introduction of water from the source. Ordinarily the rate will be adjusted to produce a discharge of gas into the tank about once every hour or two in the case of a swimming pool, or perhaps several times a day.

A convenient and desirable way of obtaining the desired pressurization of the reservoir water within the tank can be had by developing a pressure-head between the reservoir and the tank by setting at least part of the tank below the water level in the reservoir, although it will be recognized that auxiliary pressure means could be used in addition to or in lieu of the reservoir water pressure.

An optional but preferred feature resides in the provision of a support for the tank, together with valve means for preventing flow of water from the reservoir when the tank is removed from the support.

A further optional feature resides in the provision of means for attaching a disposable bottle or container of the chemical compound to and as part of the tank.

The foregoing and other features of the invention will be better understood from the following detailed description and the accompanying drawings, of which:

FIG. 1 shows a partially cut-away top view of the chlorinator of FIG. 1;

FIG. 4 shows a partially cut-away view of another form of the chlorinator and the communicating conduit and valve network for attachment thereto;

FIG. 5 is a view taken along line 5—5 of FIG. 4;

FIG. 6 is a view taken along line 6—6 of FIG. 4;

FIG. 7 shows the installation of the chlorinator shown in FIGS. 4–6 with a swimming pool; and FIG. 8 shows a partially cut-away view of the preferred form of the chlorinator.

Figure 1:
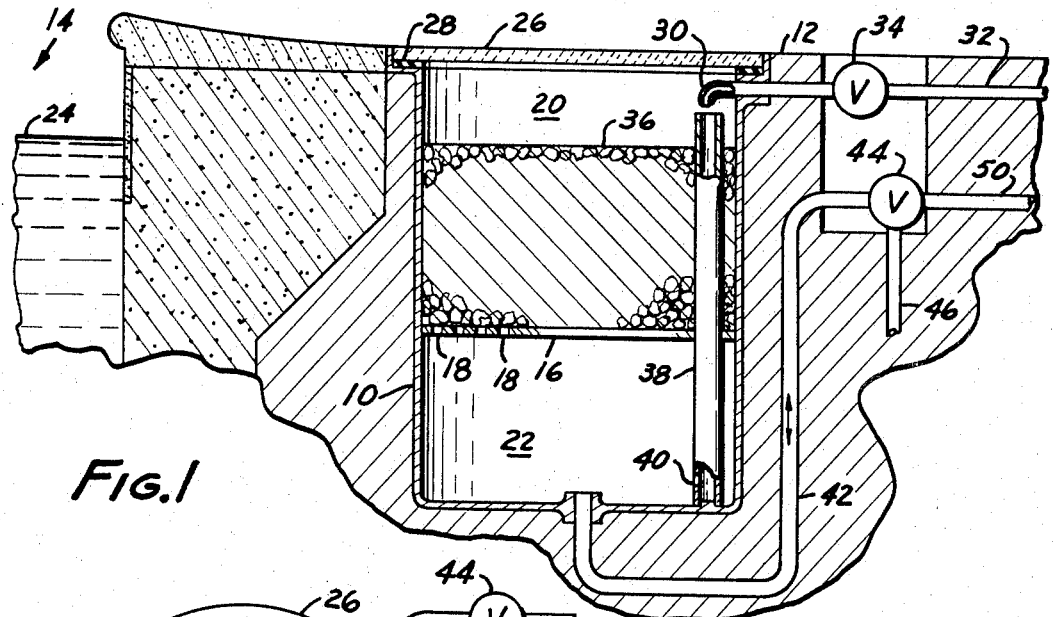
FIG. 1 shows a partially cut-away view of one form of the chlorinator and the communicating conduit and valve network for attachment thereto.
Figure 2:
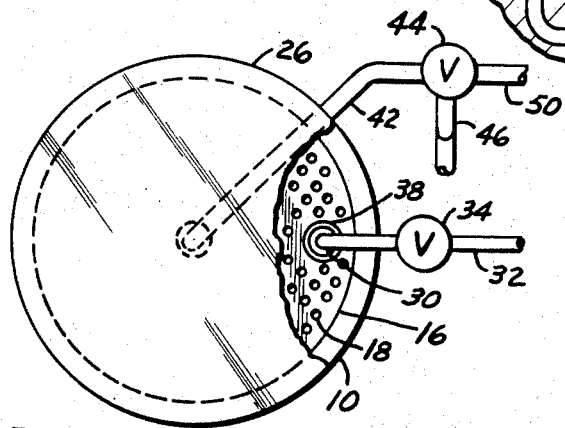
Figure 3:
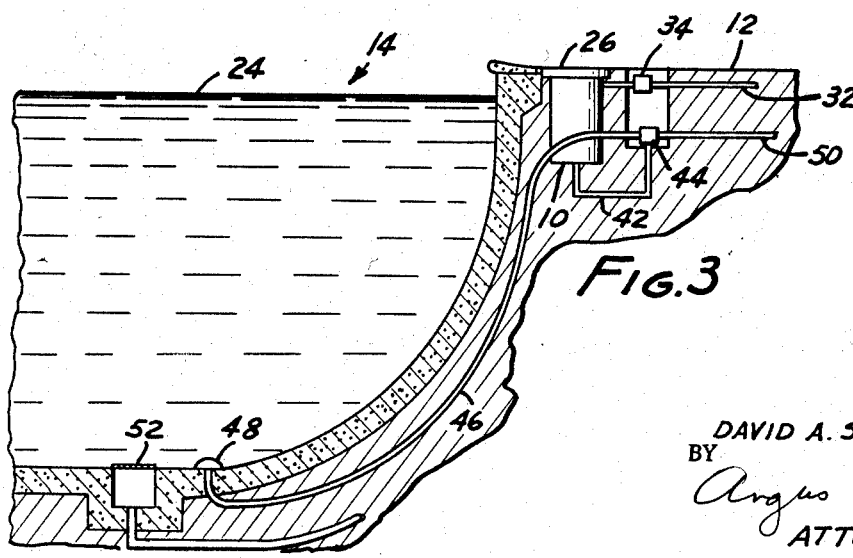
FIG. 3 shows the installation of the chlorinator shown in FIGS. 1 and 2 with a swimming pool.

The chlorinator of the present invention as shown in FIGS. 1–3 generally comprises a tank 10 having its top set flush with the deck 12 of a swimming pool 14. A grate 16 having openings or passages 18 divides tank 10 into an upper chamber 20 and a lower chamber 22. Grate 16 is located below the surface of the water in the swimming pool, as shown at 24. The top of tank 10 is suitably sealed with seal 26 and gasket 28. Seal 26 is removable so that access may be had to the upper chamber 20 of tank 10. Further, seal 26 may be transparent so that operation within the upper chamber may be observed. A drip nozzle 30 is disposed near the top of tank 10 and connected to a regulated source of water 32 under sufficient pressure to overcome the tank pressure, so that water from the source can enter the tank through a flow control valve 34 which allows water to drip into the tank at a rate regulated by the valve. The regulated source of water 32 may be filtered water from the filtering system or may be an additional supply of fresh water. Grate 16 serves to support a quantity of dry chlorine compound 36 of a type which liberates chlorine gas upon contact with water, for example, tri-chloro-s-triazine-trione. Openings or passages 18 are of such size that water is allowed to pass up, but the dry chlorine compound will not fall through. A hollow drip tube 38 is vertically disposed in the chlorinator tank to carry the water from the drip nozzle 30 to the bottom of the tank without allowing water to contact the chlorine compound 36. An opening 40 is generally disposed at the bottom of the drip tube 38 to allow communication between the drip tube and the lower chamber of the tank.

A conduit 42 is disposed near the bottom of the tank and in communication with the lower chamber 22 of the tank and with a three-way valve 44. Conduit 46 communicates with the three-way valve and with the swimming pool 14, preferably at the bottom thereof, by outlet 48. A conduit 50 connects the three-way valve 44 to the suction side of a pool pump (not shown). The three-way valve is arranged so that in one position conduit 42 is in communication with conduit 46 and in the other position conduit 42 is in communication with conduit 50.

Operation of the chlorinator shown in FIGS. 1–3 is as follows: To start the cycling, valve 44 is turned to bring conduits 42 and 46 into communication with each other causing introduction of water into the chlorinator by virtue of the pool water pressure head. Normally, the water pressure head will cause water to rise in the tank until it comes into contact with the dry chlorine compound, the compound will then give off chlorine gas in the upper chamber of the tank.

If, however, the conditions such as pressure head and tank dimensions are such that water from the reservoir will not immediately rise enough in the tank to contact the compound, the gas pressure balances the water head pressure and additional water continually being added from the source will absorb enough chlorine gas to eventually reduce the pressure within the tank to allow the tank water to rise enough to contact the dry chlorine compound causing the generation of free chlorine gas within the tank. It may be found that the gas within the tank is initially one which is not readily absorbed in water, such as air which might be admitted when the chlorinator tank is opened for purposes of adding fresh chlorine compound. Such air may be sufficiently displayed by chlorine gas by temporarily removing the cover and placing a chlorine compound pellet in a small amount of residue water in the lower chamber before bringing the chlorinator into fluid communication with the reservoir. The residue water in the lower chamber will contact the pellet causing generation of chlorine gas. By leaving seal 26 off the top of the chlorinator for a short time, the generated chlorine gas will displace a sufficient amount of air and cause the displaced air to leave the chlorinator through the top thereof. Seal 26 may then be fastened to the top of the chlorinator and valve 44 turned to bring the reservoir into fluid communication with the chlorinator. Thus the water pressure head will cause water to rise in the chlorinator until the gas pressure balances the water head pressure, and additional water continually being added from the source will absorb enough chlorine gas and raise the water level in the tank until it contacts the dry chlorine compound causing the generation of free chlorine gas in the manner hereinbefore described.

The gas pressure developed in the tank due to the wetting of the compound in the upper chamber will be sufficient to force the water in the chlorinator tank downwardly to a level below the grate until the expansion of the gas volume reduces its pressure to the point of balancing the pool water pressure. Since the chlorine gas is soluble in water, a portion of the chlorine from the pressurized chlorine gas will dissolve in the water.

Drip nozzle 30 continuously introduces water at a predetermined rate into the bottom of the chlorinator tank through the drip tube 38, and this added water creates an additional pressure within the tank, causing an expulsion of chlorinated water from the tank. The expulsion continues at a rate dependent upon the rate at which water is added through the drip nozzle until the pressure of the chlorine gas has been reduced, due to the absorption of chlorine into the added water, to allow water to come in contact and sufficiently wet the dry chlorine compound. The compound then generates more chlorine gas, and the cycle repeats.

Water will be forced from the tank through conduit 46 into the bottom of the swimming pool where the chlorinated water will be intermixed with the swimming pool water. The chlorine water solution is preferably injected into the pool near main drain 52 so that the latter may readily pick up the chlorine water and distribute it throughout the entire pool through the circulation and filtering system.

Control valve 34 may be an electrically operated solenoid valve which may be wired into the same circuit as the circulation pump (not shown) so that it may be open when the pump is operating. The valve is normally closed when the pump shuts off so that the chlorinator will also shut off.

When it is desired to service the chlorinator, valve 44 is turned to bring conduits 42 and 50 into communication. Since conduit 50 is connected to the suction side of the pump, excess water in the tank is drawn off through conduit 50. Since conduit 46 will be closed during this condition, water from the pool will not be introduced into the tank from the pool.

FIGS. 4–7 show a modified form of the invention. This form of the invention has the advantage that the tank containing the chemical is easily removable for servicing and features a check valve which automatically closes communication between the chlorinator and the pool when the chlorinator is removed.

A cylindrical tank 60 has a bottom plate 62 and a lid 64 closing the top. A chlorinator tank 66 set within tank 60 carries a grate 68 having openings or passages 70. Grate 68 rests on an annular knee 71 in tank 66 and divides tank 66 into an upper chamber 72 and a lower chamber 74. Like grate 16 in FIGS. 1–3, grate 68 is located below the surface of the water in the swimming pool at 24, and serves to support a quantity of dry chlorine compound 36. The openings or passages 70 are of such size as to allow water, but not dry chlorine compound, to pass through.

The top of tank 66 is suitably sealed with a seal mechanism 76 which is removable so that access may be had into the upper chamber 72 of tank 66. Seal 76 is fastened to the top of tank 66 with a suitable clamp ring 77. Seal 76 may be transparent so that the operation within tank 66 may be observed. Tank 66 is closed at the bottom by plate 78 which may be fastened to the tank by any suitable means such as bolts 80. Formed in plate 78 is a conduit 82 which communicates via opening 84 between the lower chamber of the tank 74 and a ball valve 86.

Ball valve 86 comprises a spherical ball 88 set loosely within a chamber 90 formed by bottom plate 62 and a ring member 63 threaded thereto. Conduit 82 passes through an opening in the ring member 63 to provide communication between chamber 90 and the lower chamber of the chlorinator tank. Conduit 46 communicates between the ball valve 86 and the swimming pool 14, preferably at the bottom thereof, by outlet 48. As shown more clearly in FIG. 5, the bottom of conduit 82 protrudes down below valve seat 96. Valve seat 96 at the top of chamber 90 is annular with essentially the same, or slightly greater, maximum radius as ball 88, the diameter of the opening through the seat being less than the diameter of the ball. Seat 96 may be conical, as shown.

Passages 92 communicate between opening 84 and chamber 90. The number of passages 92, although shown as three, may be any suitable number for passage of water to the chamber 90 from the lower chamber 74 of the chlorinator tank. Conduit 82 prevents the ball from seating on the ball valve seat 96 when the conduit protrudes below the seat. The bottom of chamber 90 communicates with conduit 46 through a passage 94 of square cross section as shown more clearly in FIG. 6. Of course, passage 94 can be any suitable configuration as long as water is permitted to flow past the ball when the ball is in its lower position. Thus, when conduit 82 is positioned, as shown, to prevent ball 88 from seating on valve seat 96, water is permitted to pass from the swimming pool through passages 92 into lower chamber 74; and during the expulsion phase, the ball rests down on the square opening 96 (the diameter of the ball being greater than a side of the square) and water is permitted to pass down past the ball through the corners of the square opening 94 into conduit 46.

A conduit 98 communicates between the lower chamber 74 and a source of water (not shown). The source of water is preferably regulated by a control valve (not shown) in the conduit 98, which will usually be located at the filtering system. The source of water may be water filtered from the filtering system or it may be an additional supply of fresh water. Conduit 98 preferably passes through the space between tanks 60 and 66, as shown, and fits to bottom plate 78 with a suitable fitting 99. A suitable port communicates between the lower chamber 74 and fitting 99 for introducing water from the source into the lower chamber.

The operation of the chlorinator shown and described in FIGS. 4–7 is essentially the same as that shown in FIGS. 1–3. Chlorinated water in the chlorinator tank is forced downwardly past the ball valve 86 through conduit 46 into the swimming pool until an equilibrium of pressure exists between the chlorinator and the water head. Conduit 98 introduces water at a predetermined rate directly into the bottom of the chlorinator tank, which absorbs additional chlorine gas, thereby maintaining the saturated solution of the water. The additional water also creates an additional pressure in the tank.

The chlorinator of FIGS. 4–7 has the feature of being easily removable for cleaning and other servicing. By disconnecting conduit 98 from plate 78, tank 66 may be removed along with its bottom plate 78. Upon removal of tank 66, conduit 82 is removed from communication with the ball valve 86. Pressure from the pool through conduit 46 will force the ball up against the valve seat 96 of chamber 90. Since the opening in the valve seat for conduit 82 is smaller than the radius of ball 88, the ball prevents water from leaving conduit 46 past the ball valve. When conduit 82 is reinserted into the ball valve 86, the ball is forced downwardly again by conduit 82 allowing communication between conduit 46 and the lower portion of the tank 74 as explained above. Thus the chlorinator is then again ready for immediate use.

The chlorinator may be restarted in a manner similar to that described in connection with the chlorinator of FIGS. 1–3. Alternatively, excess air may be displaced by placing a pellet of chlorine compound in the lower portion of the tank in a small amount of water, preferably with enough tilt of the tank to hold some water before conduit 82 is inserted into the ball valve. The chlorine gas generated thereby will displace some of the air and cause some air to flow out through conduit 82 before the conduit is inserted into the ball valve.

FIG. 8 shows the preferred form of the invention which utilizes the supplier's container in the chlorinator. Dry chlorine compound is often supplied in glass containers or bottles by the supplier. When using the chlorine compound so supplied, it may be desirable to utilize the supplier's container or bottles as the upper chamber for a chlorinator. There are two predominant reasons for using the supplier's container as part of the chlorinator. First, use of the supplier's bottle makes handling of the dry chlorine easier and safer. Second, it is expensive to line the inside of a chlorinator with a material which does not react with chlorine gas, so the use of the supplier's container as part of the chlorinator reduces the costly protective lining.

A cylindrical tank 100 having a lid 102 sealing the top of the tank is set flush with the deck 12 of the swimming pool 14. A ball valve 86, which is similar to the ball valve shown in FIGS. 4–7, is formed by a cylindrical ring member 104 which is threaded into the tank 100 forming a chamber 106. The bottom of chamber 106 communicates with conduit 46 through passage 94, as shown more clearly in FIG. 6. Spherical ball 108 is set loosely within chamber 106.

Set within tank 100 is a cylindrical member 110 having a conduit 112 formed in the bottom thereof. Conduit 112 passes through an opening in the ring member 104 to provide communication between the chamber 106 and the lower chamber 114 defined within member 110.

Conduit 112 is similar to conduit 82, shown in FIG. 5, and has passages 92 communicating between an opening 84 and the chamber 106. The valve seat 96 of chamber 106 is conical or spherical at essentially the same, or slightly greater radius as ball 108 in a manner similar to ball valve 86 in FIGS. 4–7.

Lower chamber 114 is formed by member 110 and a grate 116 resting on an annular shoulder 118, formed near the top of member 110. Grate 116 contains openings or passages 120 which are of such size to allow water, but not dry chlorine compound, to pass therethrough.

A threaded portion 122 in member 110 is provided to accommodate suitable mating threads of a container 124 containing dry chlorine compound 126. The dry chlorine compound is supplied by the supplier in container 124, which, in turn, is threaded into the threaded portion 122 in member 110 and forms a suitable upper chamber for the chlorinator.

A conduit 98 communicates between the lower chamber 114 and a source of water (not shown). The source of water is preferably regulated by a control valve (not shown) in conduit 98, which will usually be located at the filtering system. The source of water may be water filtered from the filtering system or it may be an additional supply of fresh water. Conduit 98 passes through the space between the wall of tank 100 and container 124, as shown, and fits in member 110 with a suitable fitting 127. A suitable port 128 communicates between lower chamber 114 and fitting 127 for introducing water from the source into the lower chamber.

The operation of the chlorinator shown in FIG. 8 is essentially the same as the operation of the chlorinator of FIGS. 4–7. The ball valve 86 provides the necessary communication between the pool and the chlorinator, and provides for closing the valve member 110 when it is removed for cleaning or adding additional dry chlorine compound. Upon removal of member 110, ball 108 is forced upward to seat against valve seat 96 of chamber 106, closing the opening in ring 104.

When the dry chlorine compound 126 has been exhausted, the supplier's bottle 124 may be removed from the chlorinator and a fresh supply of dry compound may be placed in the chlorinator by threading another bottle into the threaded portion 122 of member 110.

In the embodiments shown and described, the chlorinator, or at least the location of the chlorine compound in it, is placed below the level of the pool water so that the pool water pressure can wet the chlorine compound. If it should be desired to place the chlorinator tank at a higher position, for example, on top of the pool deck, an auxiliary pressurization arrangement would be used. This could take the form of a pump in conduit 46, capable of raising the water to the level of the chlorine compound.

The present invention provides for treating of a reservoir of water, such as a swimming pool, in such quantities that the pool is always ready for continued use. The apparatus is safe, reliable, and easily maintained.

This invention is not to be limited by the embodiment shown in the drawings and described in the description, which is given by way of example only and not of limitation, but only in accordance with the scope of the appended claims.

What is claimed is:

1. A device for chemically treating water in a reservoir of water comprising: an enclosed tank; means adapted to support within the tank at a position above the bottom of the tank a chemical compound of a type which emits gas soluble in water upon contact with water; communicating means adapted to communicate between said reservoir and a region of the tank below said compound for enabling water to flow between said tank and said reservoir; whereby when the water level in the tank is sufficiently high to wet the compound said compound liberates soluble gas which partially dissolves in the water in said tank; and means for supplying water from a source to said region of the tank for absorbing soluble gas and increasing the pressure within said tank to force gas-containing water in said tank out through said communicating means and into the reservoir.

2. The combination according to claim 1 further including means adapted to support said tank, means forming an opening in said means adapted to support said tank, said communicating means comprising a valve, first conduit means for communicating between said valve and said reservoir and a second conduit protruding from said tank and in communication with said region of the tank, said second conduit being adapted to pass through said opening to force said valve open whereby removal of said tank from said means adapted to support said tank will cause the water pressure to force said valve closed.

3. The combination as set forth in claim 1 wherein said communicating means comprises a ball valve, said ball valve having a ball in a valve chamber, first conduit means for communicating between said region of the tank and said valve chamber, second conduit means for communincating between said valve chamber and said reservoir, and a valve seat in said valve chamber juxtaposed to said first conduit means whereby upon removal of said first conduit means the water pressure forces said ball against said valve seat closing said valve.

4. The combination as set forth in claim 1 wherein said tank includes means forming a window for visual inspection of the chemical compound in said tank.

5. The combination as set forth in claim 1 wherein said means for supplying water from a source comprises a control valve connected to said source and a conduit connected to said control valve for introducing a regulated flow into the region of the tank.

6. The combination as set forth in claim 1 wherein said communicating means comprises a valve, said valve having a first position to establish communication between said region of the tank and said reservoir.

7. The combination as set forth in claim 6 further comprising a pump, said valve having a second position whereby water is removed from said tank by said pump.

8. The combination according to claim 1 wherein said means adapted to support a chemical compound comprises a support means for dividing the tank into an upper and a lower chamber, means permitting the passage of water between the lower chamber and the upper chamber, said upper chamber being adapted to contain said chemical compound, said communicating means being adapted to communicate between said lower chamber and said reservoir, and said means for supplying water from a source being adapted to supply water to said lower chamber.

9. The combination according to claim 8 wherein said upper chamber is formed by a supplier's container and means connected to said lower chamber for attaching said container to said support means.

10. The combination as set forth in claim 1 wherein the pressure of water from said reservoir is developed by a water head pressure due to a level of water in said reservoir, said means adapted to support a chemical compound being located below said level.

11. The combination according to claim 10 wherein said means adapted to support a chemical compound comprises a support means for dividing the tank into an upper and a lower chamber, means permitting the passage of water between the lower chamber and the upper chamber, said upper chamber being adapted to contain said chemical compound, said communicating means being adapted to communicate between said lower chamber and said reservoir, and said means for supplying water from a source being adapted to supply water to said lower chamber.

12. The combination as set forth in claim 11 wherein said means for supplying water from a source comprises a control valve connected to said source and a conduit connected to said control valve for introducing a regulated flow into the lower chamber of said tank.

13. The combination as set forth in claim 12 wherein said conduit is connected into the upper chamber of said tank and a drip tube communicates with said conduit for introducing the regulated flow to the lower chamber of said tank, said tank including means forming a window for visual inspection of the treating compound within said upper chamber and of the operation of said drip tube.

14. The combination as set forth in claim 13 wherein said communicating means comprises a valve, said valve having a first position to establish communication between said lower chamber and said reservoir.

15. The combination as set forth in claim 14 further comprising a pump, said valve having a second position whereby water is removed from said lower chamber by said pump.

16. The combination as set forth in claim 11 wherein said communicating means comprises a ball valve, said ball valve having a ball in a valve chamber, first conduit means for communicating between said lower chamber and said valve chamber, second conduit means for communicating between said valve chamber and said reservoir, and a valve seat in said valve chamber juxtaposed to said first conduit means whereby upon removal of said first conduit means said water head pressure forces said ball against said valve seat closing said valve.

17. The combination according to claim 16 wherein said upper chamber is formed by a supplier's container and means connected to said lower chamber for attaching said container to said supply means.

18. The method of chlorinating water in a water reservoir which comprises placing the water of the reservoir in communication with an enclosed tank which contains a compound capable of releasing chlorine gas upon contact with water, applying sufficient pressure to the reservoir water entering the tank to cause it to rise sufficiently to wet the compound to generate chlorine gas, dissolving some of the chlorine gas in the water in the tank and developing sufficient pressure of the undissolved chlorine gas in the tank to drive chlorine-containing water out of the tank and into the reservoir, and introducing water into the tank to absorb undissolved gas in the tank and to cause water to rise again in the tank to wet the chlorine compound again to generate more chlorine gas, and repeating the cycle.

19. The method according to claim 18 wherein the water introduced into the tank to absorb undissolved gas develops a pressure within the tank to further drive chlorine-containing water out of the tank and into the reservoir.

20. The method according to claim 19 wherein the water introduced into the tank to absorb undissolved gas raises the water level within the tank to wet the chlorine compound upon a reduction of the pressure of the chlorine gas within the tank, thus repeating the cycle.

References Cited

UNITED STATES PATENTS

| | | | |
|---|---|---|---|
| 2,820,701 | 1/1958 | Leslie | 210—169 X |
| 3,129,172 | 4/1964 | Dickey et al. | 210—169 |

MICHAEL E. ROGERS, *Primary Examiner.*